United States Patent [19]

Pankin

[11] Patent Number: 4,562,517
[45] Date of Patent: Dec. 31, 1985

[54] REFLECTOR SYSTEMS FOR LIGHTING FIXTURES AND METHOD OF INSTALLATION

[75] Inventor: Sidney M. Pankin, San Rafael, Calif.

[73] Assignee: Maximum Technology, Brisbane, Calif.

[21] Appl. No.: 577,837

[22] Filed: Feb. 7, 1984

Related U.S. Application Data

[63] Continuation-in-part of Ser. No. 470,091, Feb. 28, 1983, abandoned.

[51] Int. Cl.$^4$ ................................................. F21S 3/00
[52] U.S. Cl. ..................................... 362/147; 362/217; 362/241; 362/296; 362/346
[58] Field of Search ................ 362/145, 147, 217, 220, 362/224, 225, 227, 233, 237, 240, 241, 247, 249, 252, 260, 254, 296, 297, 298, 301, 302, 341, 346

[56] References Cited

U.S. PATENT DOCUMENTS

| | | |
|---|---|---|
| 1,949,709 | 3/1934 | Coy . |
| 2,285,001 | 6/1942 | Wilson ................................ 362/217 |
| 2,418,195 | 4/1947 | Rolph ................................. 362/217 |
| 2,591,661 | 4/1952 | McCandless ....................... 362/217 |
| 2,619,583 | 11/1952 | Baumgartner . |
| 3,329,811 | 7/1967 | Schiffer et al. . |
| 3,549,879 | 12/1970 | Meyer . |
| 4,054,793 | 10/1977 | Shemitz ............................. 362/224 |
| 4,078,169 | 3/1978 | Armstrong ........................ 362/217 |
| 4,236,193 | 11/1980 | Brandt . |
| 4,242,725 | 12/1980 | Douma et al. . |
| 4,277,820 | 7/1981 | Bostonian ......................... 362/223 |
| 4,300,185 | 11/1981 | Wakamatsu . |
| 4,307,150 | 12/1981 | Roche . |
| 4,310,876 | 1/1982 | Small, Jr. ......................... 362/217 |
| 4,336,576 | 6/1982 | Crabtree . |
| 4,344,111 | 8/1982 | Ruud et al. . |
| 4,390,930 | 6/1983 | Herst et al. . |
| 4,403,275 | 9/1983 | Oser . |

FOREIGN PATENT DOCUMENTS 47908  8/1979  Japan .................................. 362/216
575817  3/1946  United Kingdom ............... 362/216

OTHER PUBLICATIONS

"Super Reflectors for Energy Efficient Luminaires" by D. M. Finch and R. A. D. Schwartz.
"Super Reflectors for Energy Efficient Buildings" by D. M. Finch, R. A. D. Schwartz and S. M. Pankin.

Primary Examiner—Craig R. Feinberg
Assistant Examiner—David A. Okonsky
Attorney, Agent, or Firm—Sherman & Shalloway

[57] ABSTRACT

Apparatus and method are disclosed herein which enable the retrofitting of existing lighting fixtures so as to improve their efficiency, improve their light distribution and better control heat emanation therefrom. The apparatus embodiments comprise different specific configurations of reflectors which may be utilized to replace one or more lamps in an existing fixture with no more than minor modifications thereof. For example, a fixture with four bulbs may be modified in accordance with the teachings of the present invention by replacing up to three of the bulbs thereof with one or more reflectors designed according to the present invention. Further, reflectors in accordance with the present invention may be installed in a fixture without removing lamps to increase the lumen output thereof. The methods disclosed herein relate to the various steps which are necessary in replacing one or more light bulbs in an existing fixture with one or more reflectors to achieve the above-stated goals. These steps may include minor modifications to the existing fixture such as, for example, movement of the ballast thereof and movement of the lampholders thereof. In the preferred embodiment of the present invention, the reflectors which are used are made of a material possessing the property of total and in most cases spectral reflectivity of greater than 90%. One material which has been found to be suitable for this use comprises a thin silver film coated onto a thin plastic film. Further, the reflectors of the present invention may be used in newly designed fixtures.

8 Claims, 38 Drawing Figures

REFLECTOR SYSTEMS FOR LIGHTING FIXTURES AND METHOD OF INSTALLATION

BACKGROUND OF THE INVENTION

This application is a continuation-in-part of U.S. patent application Ser. No. 470,091 filed Feb. 28, 1983 now abandoned.

In the prior art, numerous examples are known of lighting fixtures having one or more lamps therein for the purpose of providing artificial light. In the prior art fixtures known to applicant, the reflector systems thereof are generally designed for function, production and aesthetics considerations, and, as such, lighting fixtures are generally quite inefficient and tend to generate a lot of heat but not as much light as their energy consumption would tend to indicate. Some fixtures are designed so that the reflectors thereof distribute light rays throughout the area to be lighted by diffusion, and this type of reflector tends to cause a lot of heat generation in the fixture.

The following prior art is known to applicant:

U.S. Pat. No. 4,344,111 to Ruud, et al., discloses several embodiments of light fixtures including reflectors which may be made of "one or more pieces of specular reflective material, such as polished anodized aluminum or metal coated mylar . . . " The inventions disclosed in this patent are vastly different from those disclosed herein for many reasons including (1) there is no contemplation in this patent of the concept of retrofitting a reflector into an existing light fixture so as to replace one or more light bulbs originally located therein, (2) while there is a disclosure in this patent of the concept of metal coated mylar, there is no disclosure in this patent of the concept of a thin film of silver coated with plastic being used as a reflective material.

U.S. Pat. No. 4,390,930 to Herst, et al., discloses that a reflector for a light fixture may be made of "a highly reflective metal material, such as specular aluminum, or aluminum with high and low index of refraction coatings, or silver . . . " The disclosure of this patent is vastly different from that of the present disclosure for many reasons including (1) there is no disclosure therein of the concept of retrofitting of an existing lighting fixture with one or more reflector means to replace one or more light bulbs from the fixture, and (2) the mere disclosure of a reflector made of "silver" is vastly different from the material disclosed herein, to wit, an extremely thin film of silver associated with an extremely thin film of plastic. Silver, as used in reflectors in the prior art for example, in mirrors, is not usable in lighting fixtures in view of the extremely heavy weight thereof and the mere disclosure of the use of "silver" does not teach or suggest the concept of an extremely thin silver film with an extremely thin plastic layer adjacent thereto. Further, the word "silver," per se, without the accompanying statement that it is "specularly reflective" does not imply specular reflectivity since silver could be used if desired in the same manner that the prior art uses baked-on white porcelain-type reflectors for diffusion purposes.

U.S. Pat. No. 4,403,275 to Oser discloses a multi-lamp fluorescent fixture normally having, for example, four fluorescent tubes and in which two of the tubes are replaced with angular reflector elements. These reflector elements are disclosed as being made of "a highly reflective metal material such as aluminum having a surface coating of anionic oxide." Thus, this patent does, in fact, disclose the concept of retrofitting an existing lighting fixture to replace light bulbs thereof with respective reflectors, however, there are many differences between the concepts taught by this patent and those taught by the present invention, some of which are noted as follows:

(1) In the present invention, in all embodiments thereof, the reflector or reflectors are mounted within the lighting fixture in such a manner as to totally enclose the lamp-reflecting area. In Oser, the replacement reflectors comprise substantially straight sections of material which only cover a small area of the reflecting area of the fixture. They do nothing to reflect light emanating from those light bulbs which remain in the fixture and, as such, totally contrary to the teachings of the present invention, fail to enhance the efficiency of the remaining light bulbs therein. Tests by applicant have revealed at least a 50% increase in efficiency over the Oser concept through use of the concepts taught herein. In the present invention, again the entire reflecting area is enclosed by the reflector or reflectors used, including the areas in immediate surrounding relation to the light bulb or bulbs which remain in the fixture after the retrofitting operation is completed.

(2) Oser discloses the preferred material for his reflectors as polished aluminum which has limited specular reflectivity as compared to the materials disclosed in the present invention.

(3) The invention disclosed by Oser is limited to only one application, to wit, a two-foot by four-foot in dimension four-bulb shielded fixture. Conversely, the reflectors disclosed herein are designed to be applicable to any lighting situation and to any lighting fixture.

(4) In Oser, the reflector devices are attached to the absolute weakest portion of the existing fixture, to wit, the plastic lamp holders which are easily breakable and thus extremely dangerous to use in this situation. Conversely, the reflectors disclosed herein are specifically designed to be attached through suitable means to the actual fixture housing itself to thereby permanently attach them thereto.

(5) In Oser, it is disclosed that by replacing two of the four light bulbs in the above-described fixture with reflectors in accordance with the Oser invention, the light output of the fixture is reduced to 72.1% of its illumination provided with four bulbs while only 49.9% of the power previously consumed is used. In accordance with the present invention, and in similar circumstances, with the same power consumption, it is expected that the illumination provided with the reflectors of the present invention installed would be at least 90% of the light provided with four light bulbs.

Also known to applicant are two papers:

(a) "Super Reflectors For Energy Efficient Luminaires" by D. M. Finch and R. A. D. Schwartz was presented at the 1980 Illuminating Engineers Society Meeting. In this paper, comparison is made of several different reflector materials including "silver type super reflectors" as installed in "two typical types of luminaires." While this paper discloses "partial or total enclosure of the light source " by the luminaire, no disclosure is made of (1) the specific structure of the reflectors, (2) the use of reflectors to replace one or more lamps in a fixture, or (3) the specific methods of retrofitting disclosed herein.

(b) "Super Reflectors For Energy Efficient Buildings" by D. M. Finch, R. A. D. Schwartz and S. M.

Pankin was presented at the 1981 Illuminating Engineers Society Meeting. This paper is self-described as "a sequel to last year's paper . . . ," and includes several examples of basic retrofitting schemes. The paper does not disclose (1) the specific structure of reflectors disclosed herein, (2) the specific detailed methods of retrofitting disclosed herein, or (3) the variety of applications disclosed herein.

Applicant is also aware of the following U.S. patents which are believed to be of only general interest:

U.S. Pat. No. 1,949,709—Coy
U.S. Pat. No. 2,619,583—Baumgartner
U.S. Pat. No. 3,329,811—Schiffer, et al.
U.S. Pat. No. 3,549,879—Meyer
U.S. Pat. No. 4,236,193—Brandt
U.S. Pat. No. 4,242,725—Douma, et al.
U.S. Pat. No. 4,300,185—Wakamatsu

SUMMARY OF THE INVENTION

Lighting in commercial and office buildings will usually represent 40% to 80% of the electrical energy used in the building. Most fixtures used in commercial and office buildings comprise modular or surface-mounted rectangular fixtures including two, three or four fluorescent light bulbs therein. Most of these fixtures further utilize a lamp shield which may typically be a clear prismatic type material, a white diffuse material or some form of louver. In view of the high percentage of electricity expended in lighting applications, a great savings of electricity would be possible if the amount of wattage consumed by each fixture in a building could be significantly reduced. One way to reduce this wattage consumption would be to remove one or more lamps from each fixture in a building. While energy would always be saved by this process, several problems would develop. Firstly, the removal of lamps with no other modification of the fixture could reduce the lighting within the area below a normal and required operating level. Further the lighting environment of the area might become dreary and depressing. Further, employees would most likely object quite vehemently at the reduction of lumen output of the fixtures and, under normal circumstancs, they would know that the lamps had been removed due to the deep shadows created along the surface of the light shield due to the missing lamps. One way to overcome the above-noted problems is to combine the removal of lamps with their replacement by reflecting means. However, the sole known prior art reference which was discussed above (Oser) fails to take advantage of the entire surface area of the fixture in retrofitting a reflector therein.

In conjunction with the above-described prior art for retrofitting of a reflector, a further problem has become evident which is related to the inherent design of lighting fixtures. Most lighting fixtures are designed to emit light therefrom through interreflection therein, which interreflection embodies itself in light from the lamp or lamps bouncing around the reflective surfaces of the fixture prior to leaving the fixture. When the fixture includes a shielding device which allows only partial transmission therethrough of the light, the light which is not transmitted therethrough is reflected back to the reflector and then reflected back toward the shield and then, after a number of such interreflections, leaves the fixture as light. If the reflectivity of the particular reflector or reflectors employed is not 100%, each reflection of light off of the reflector or reflectors reduces the light output of the fixture by the percentage of reflectivity of the reflector or reflectors. The energy absorbed by the reflector or reflectors, which energy comprises the light which is not reflected, is transformed into heat energy which acts to severely heat the fixture causing reduced lifespan thereof as well as undesirable heating of the area which is being lighted. This heating is evidence of the level of efficiency of the fixture. As such, the higher the reflectivity of the reflectors, the higher the efficiency of the reflectors and fixture and the less heat and more light emitted by the fixture. In the prior art, the material which was best suited for reflector use was specular aluminum material having a total reflectivity of approximately 80% to 89% and an efficiency of approximately 67% to 73%.

When a light ray is interreflecting within a fixture, as stated above, with each additional reflection, the radiant flux of the light ray is reduced by the percent of total reflectance of the reflecting surface. As such, in the case where a reflector is made of aluminum having a total reflectance of approximately 89%, in the best case, after four reflections, the light ray would retain only approximately 63% of its original radiant flux. As such, a need has developed for a reflector or reflectors which enable a multiplicity of interreflections without a corresponding large loss in radiant flux and efficiency of the fixture.

The present invention overcomes the above-described deficiencies in the prior art and achieves the above-described goals by providing the following inter-related features:

(1) In a first aspect of the present invention, existing fixtures are modified in accordance with the present invention through a removal of one or more of the lamps thereof and replacement of these one or more lamps with a reflector or reflectors designed to reflect the light emanating from those light bulbs remaining in the fixture with this reflection resulting in increased efficiency and reduction of heat in the fixture.

(2) In some cases, the invention includes the concept of relocating the lamp or lamps remaining within the fixture to a location therein better suited for the efficient transmission of light into the area which is to be lighted by the fixture or fixtures.

(3) In some instances, the invention includes the concept of relocation of the fixture ballast or ballasts to a more favorable location so as to facilitate better light transmission as well as reflector installation.

(4) The invention may also include a combination of the following modifications:
(1) relocation of ballast(s)
(2) relocation of lamp(s) and lampholder(s)
(3) replacement of ballast(s)
(4) installation of new raceway(s) and cover plate(s).

(5) In a further aspect of the present invention, in order to increase the efficiency of each fixture to the maximum possible level, the reflectors contemplated by the present invention are made of a material which maximizes both reflectivity and efficiency thereof to thereby maximize light transmission into the area being lighted while minimizing the heating of the fixture by the light impingement on the reflector or reflectors. One preferred material which has been found to be usable in the reflectors of the present invention comprises a material approximately three mils in thickness made of a polyester film, vapor coated with silver to form a semi-opaque surface which, in turn, is coated with a water-clear acrylic overlay to provide light instability and prevent corrosion of the silver. The back of the polyester may be coated with a pressure-sensitive adhesive or other type adhesive if desired so as to enable attachment of the film to a substrate preferably made of metal. The above-described film has been tested by applicant and achieves a total combined reflectance of approximately 96% to 99.6% with this reflectance being approximately 93% to 97% specular reflectance and approximately 3% to 4% diffuse reflectance. In the discussion hereinabove, it was noted that the next best known material, specularly reflective aluminum, has a specular reflectance of no more than 89% and, further as discussed above, after four reflectances, the total radiant flux of light rays reflected off of the specularly reflective aluminum would be approximately 63% of the original radiant flux thereof. With the polyester film with silver disclosed hereinabove, and in an example wherein the total reflectance is 96%, which is fully within the purview of this material, the total radiant flux of light rays reflected four times off of this film would be approximately 85% of the original unreflected radiant flux for an increase of approximately 35% over the radiant flux for the light rays when reflected four times off of the specularly reflective aluminum. Since typical fixtures with their semi-opaque covers typically are designed to reflect the light two to five times, it is seen that significant improvement in lighting efficiency is achieved through the use of the reflector as disclosed herein.

(6) As stated above, the higher the efficiency of the reflector, the less light which is transformed therein into heat. Aluminum reflectors have an efficiency of between approximately 67% to 73% whereas the reflector made of the polyester vapor-coated with silver has an efficiency of approximately 82% which is greater than the efficiency of aluminum as described above by a range of from 12.5% to 18.8%. It is seen that the material contemplated in the present invention for use in the reflectors of the present invention would clearly provide increased light output while significantly reducing the heating of the fixture.

(7) A further aspect of the present invention lies in the fact that the reflectors contemplated herein are designed so as to completely surround the reflecting area of the fixture which is being retrofitted. In this way, the light emanating from the lamp or lamps remaining within the fixture after retrofitting is carefully controlled by the reflector system of the present invention so as to maximize the light output from the fixture while, due to the above-described efficiency thereof, minimizing the heating of the fixture.

(8) In accordance with the present invention, it is contemplated that the reflectors will be specifically configured angularly so as to closely simulate the original placement of light bulbs within the fixture. In further explanation, if a light bulb is being replaced with a reflector in accordance with the present invention, the reflector includes angled portions specifically designed so that a person looking upwardly at the fixture or fixtures will see what appears to be, for example, four lamps therein, whereas, in reality, the viewer is seeing two lamps and their reflections in two respective angular surfaces of a reflector designed in accordance with the present invention. As a further example, a three lamp fixture may be retrofitted through removal of one lamp and addition of reflectors so as to simulate a four lamp fixture.

(9) As described in (6) above, one material suitable for use in conjunction with the present invention comprises a film approximately three mils thick comprising a polyester film vapor-coated on one side with silver, coated with adhesive on the other side, and with the silver being coated with an acrylic. In accordance with the present invention, another material, which has been found to be usable in conjunction therewith, comprises a reflector film of approximately 1.5 mils in thickness or less and being made of a polyester film sputtered on one side with silver in an argon atmosphere, and with the silver being coated on its opposite side with an adhesive. The efficiency and reflectivity of this material used as a reflector are virtually the same as those of the material described in (6) above, to within ±2%.

(10) The present invention also includes the methods of retrofitting reflectors which correspond to the items discussed above in numbers (1) through (9). These methods will be more particularly described hereinafter.

OBJECTS OF THE INVENTION

It is a first object of the present invention to reduce the power consumption of existing lighting fixtures by removing one or more of the lamps located therein.

It is a further object of the present invention to increase the efficiency of such lighting fixtures by retrofitting thereto an improved reflector system in accordance with the present invention.

It is still a further object of the present invention to provide such a reflector system which has an extremely high percentage of reflectivity to thereby increase the efficiency of the fixture.

It is yet a further object of the present invention to provide such a retrofitted reflector with an extremely high percentage of reflectivity to thereby enable the removal of one or more lamps from an existing lighting fixture while maintaining substantially the same level of lumen output from the lighting fixture as was present prior to the retrofitting operation.

It is a yet further object of the present invention to make the reflectors thereof of an extremely thin film of silver associated with a plastic cover, which reflector material is extremely light, efficient and has an extremely high level of specular reflectivity.

It is a still further object of the present invention to make slight modifications to existing lighting fixtures during the retrofitting operations included in the present invention.

It is a still further object of the present invention to slightly modify existing lighting fixtures by relocating lamp holders thereof.

It is a yet further object of the present invention to slightly modify existing lighting fixtures by relocating the ballast or ballasts thereof and by elimination of some ballasts in multiple fixture installations through the use of tandem wiring.

It is a yet further object of the present invention to slightly modify fixtures by both relocating lamp holders and relocating the ballasts thereof.

These and other objects, advantages, aspects and other features will be better understood from the following specific description of the preferred embodiments when read in conjunction with the appended drawing figures. The specific description of the preferred embodiments and the appended drawing figures merely illustrate examples of applications of the present invention, and should only be construed as such.

SPECIFIC DESCRIPTION OF THE PREFERRED EMBODIMENTS

Figure 1:
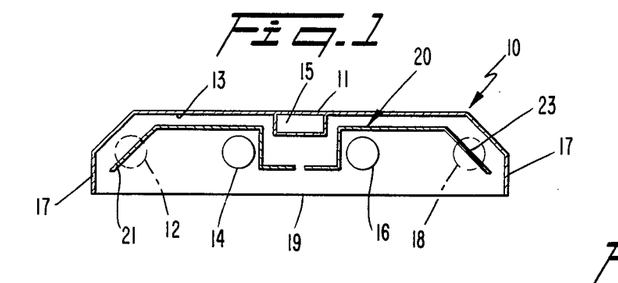
FIGS. 1 and 2 show schematic end views of two examples of the retrofitting of four-lamp fixtures in accordance with the present invention.
Figure 2:
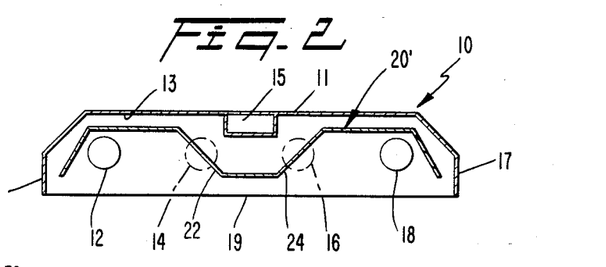

Referring now to FIGS. 1 and 2, a lighting fixture 10 is seen to include a housing structure 11, the inside surface 13 of which may provide a reflective surface such as, for example, white baked porcelain, or metallic type finish. Further, the housing 11 includes a centrally-mounted ballast 15, side portions 17 and a cover 19 which may be louvered, transparent or translucent, and could also comprise any other well-known lamp fixture cover structure. The fixture 10 shown in FIGS. 1 and 2 normally has fluorescent lamps 12, 14, 16 and 18 mounted therein.

In FIG. 1, the fixture 10 has been shown retrofitted in accordance with the present invention by removing the outside lamps 12 and 18 therefrom and, further, by installing therein a reflector 20 including angled portions 21 and 23 and other portions thereof which extend behind the remaining lamps 14 and 16 and which cover the ballast 15. As can be seen in FIG. 1, the reflector 20 completely surrounds the entire light-transmitting area of the lamps 14 and 16. Further, the portions 21 and 23 of the reflector 20 are angled in such a manner that a person looking upwardly at the fixture will see the reflection of the lamp 14 in the portion 21 and the reflection of the lamp 16 in the portion 23. As such, the reflector 20 provides the illusion that all four lamps still remain within the fixture, while cutting the power consumption of the fixture in half. Further, due to the high specular reflectivity and efficiency of the reflector 20, the light output of the fixture 10 after retrofitting is virtually the same as the light output prior to retrofitting.

With reference now to FIG. 2, the fixture 10 has been retrofitted, in this case, by removing the lamps 14 and 16 and by installing the reflector 20'. The reflector 20' includes angled surfaces 22 and 24 so designed that a person looking upwardly at the fixture 10 will see the reflection of the lamp 12 in the surface 22 and the reflection of the lamp 18 in the surface 24 so that the viewer sees what appears to be four lamps still remaining in the fixture. The efficiency and lumen output of the fixture 10 as retrofitted as shown in FIG. 2 are substantially the same as those values for the embodiment of retrofitting shown in FIG. 1. It is noted that the reflector 20' could also be utilized in a three lamp fixture such as that which is shown in FIGS. 3-5 by removing the central lamp and installing the reflector 20' so as to create the illusion of a four lamp fixture.

Figure 3:
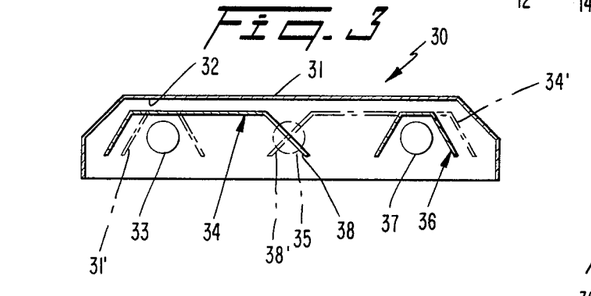
FIGS. 3, 4 and 5 show schematic end views of the retrofitting of three-lamp fixtures in accordance with the present invention.
Figure 4:
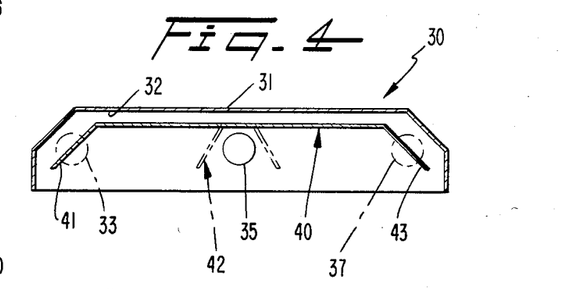
Figure 5:
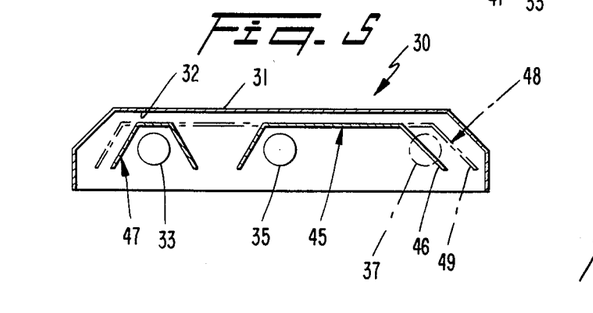

With reference now to FIGS. 3-5, a fixture 30 is shown which includes a housing 31 which has mounted therein three lamps 33, 35 and 37. The surface 32 of the housing 31 may customarily include some reflective light surface thereon which may be a baked white porcelain or metal or other type.

With reference to FIG. 3, it is seen that the fixture 30 has been retrofitted by removing the center lamp 35 and by installing into the housing 31 reflectors 34 and 36. As is seen, the reflector 34 includes a surface 38 designed to create the illusion to the viewer that the lamp 35 remains within the fixture 30, however, in reality, what the viewer is seeing is a reflection of the lamp 33. Further, the reflector 36 completely surrounds the lamp 37 on three sides to thereby increase the lumen output thereof. If desired, the reflectors 34' and 36' shown in phantom may be, instead, employed. In the reflector 34' the surface 38' creates the illusion that the center lamp remains in the fixture, whereas in reality, what the viewer is seeing is a reflection of the lamp 37.

Referring now to FIG. 4, it is seen that the fixture 30 has been modified by removing the outer lamps 33 and 37 and by installing therein a reflector 40 including a surface 41 which creates the illusion that the lamp 33 remains within the fixture and with a further surface 43 which creates the illusion that the lamp 37 is still within the fixture. If desired, alternatively, the reflector 42 may be installed which merely closely surrounds the remaining lamp 35.

Referring now to FIG. 5, it is seen that the fixture 30 has been modified by removing the outer lamp 37. In the retrofitting operation, a reflector 45 has been installed which surrounds the existing lamp 35 and the region where the removed lamp 37 was located. The reflector 45 includes a surface 46 which creates the illusion that the lamp 37 remains within the fixture. Further a reflector 47 is mounted in surrounding relation to the outer lamp 33 and closely surrounds the lamp 33 to thereby increase the lumen output thereof. Alternatively, instead of installing the reflectors 45 and 47, the reflector 48 shown in phantom may be installed which is mounted to extend completely across the housing 31 and thereby surround the lamp 33, the lamp 35 and the region where the lamp 37 previously was located and would also include surface 49 to create the illusion that the lamp 37 remains within the fixture.

Figure 6:
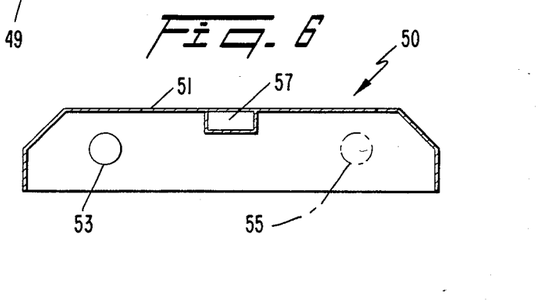
FIGS. 6, 7, 8 and 9 show schematic end views of a two-lamp fixture and illustrate sequentially the retrofitting and modification thereof in accordance with the present invention.
Figure 7:
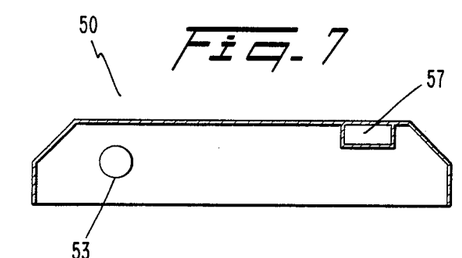
Figure 8:
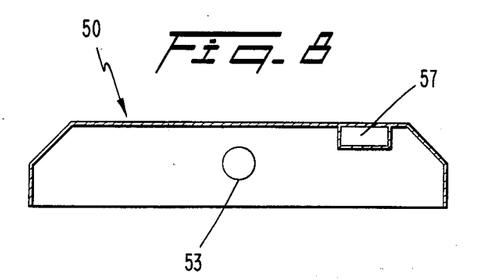
Figure 9:
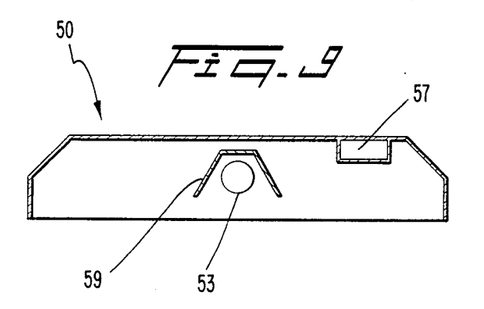

With reference now to FIGS. 6-9, a retrofitting procedure will be described which, while shown only in conjunction with a two-lamp fixture, is applicable to any fixture including a plurality of lamps and at least one ballast. FIG. 6 shows a fixture 50 including housing 51 and lamps 53 and 55. The housing 51 further includes a centrally-located ballast 57. As shown in FIG. 6, the first step which is followed is the removal of the lamp 55. Thereafter, as shown in FIG. 7 the ballast 57 is relocated by moving it to the position previously occupied by the lamp 55. Thence, the lamp 53 is moved to a central position in the fixture as shown in FIG. 8. Finally, a reflector 59 is mounted in the housing 51 and in surrounding relation to the lamp 53. As such, FIGS. 6-9 illustrate a procedure wherein a lamp is removed, a ballast is moved to make way for the relocation of the remaining lamp and a reflector is installed to enhance the efficiency and lumen output of the modified fixture.

Figure 10:
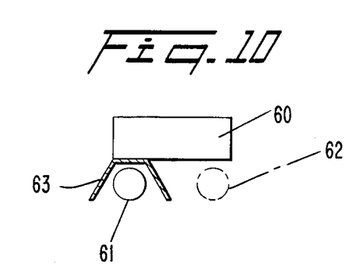
FIGS. 10-14 show end schematic views exemplary of the retrofitting of unshielded two, three and four lamp fixtures in accordance with the present invention.

FIGS. 10-14 illustrate unshielded fixtures having two, three and four lamps as original equipment therein. FIG. 10 shows a fixture 60 including lamps 61 and 62 which has been modified through the removal of the lamp 62 in accordance with the teachings of the present invention and has been further modified through the introduction of a reflector 63 in surrounding relation to the lamp 61. This modification is to be distinguished from those shown with reference to FIGS. 1-5 as no effort is made to create an illusion that the lamp which has been removed still remains within the fixture.

Figure 11:
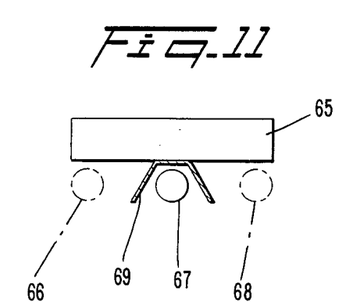

FIG. 11 shows a fixture 65 including lamps 66, 67 and 68 which has been modified through the removal of the lamps 66 and 68 and through the introduction of a reflector 69 in surrounding relation to the remaining lamp 67. Again, no attempt has been made to create the illusion that lamps which have been removed still remain within the fixtures 65.

Figure 12:
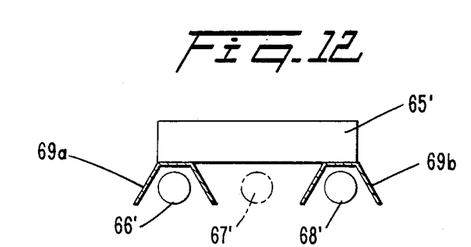

FIG. 12 is similar to FIG. 11 and shows a fixture 65' including lamps 66', 67' and 68' and wherein the center lamp 67' has been removed and reflectors 69a and 69b have been installed in respective surrounding relationship to lamps 66' and 68'. Again, no illusion has been created with regard to the removed lamp 67'.

Figure 13:
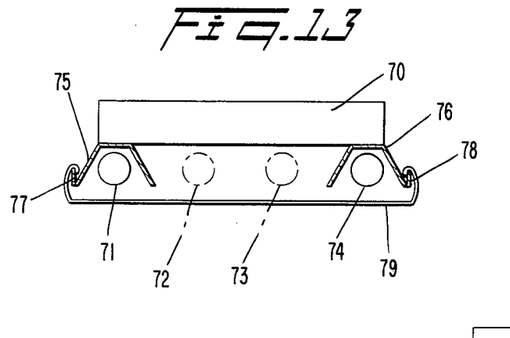
Figure 14:
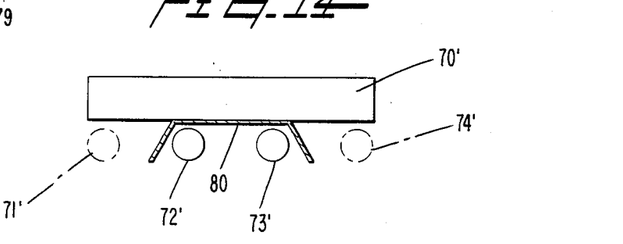

FIGS. 13 and 14 show two examples of unshielded four-lamp fixtures which have been modified in accordance with the teachings of the present invention. FIG. 13 shows a fixture 70 including lamps 71, 72, 73 and 74. The lamps 72 and 73 have been removed, and the lamps 71 and 74 have been surrounded by respective reflectors 75 and 76. If desired, the outer edges of these reflectors 75 and 76 may include respective upstanding portions 77 and 78 adapted to receive in mounting relationship downturned edges of a lens 79 which, as such, may be added to the fixture 70. FIG. 14 shows a fixture 70' including lamps 71', 72', 73' and 74' and wherein the lamps 71 and 74 have been removed and a reflector 80 has been mounted in surrounding relation to the remaining lamps 72' and 73'. Alternatively, individual reflectors (not shown) may be mounted in surrounding relation to the individual lamps 72' and 73'.

Figure 15:
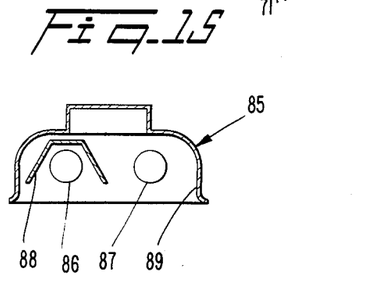
FIGS. 15-19 show schematic end views exemplary of the retrofitting of industrial two, three and four lamp fixtures in accordance with the present invention.
Figure 16:
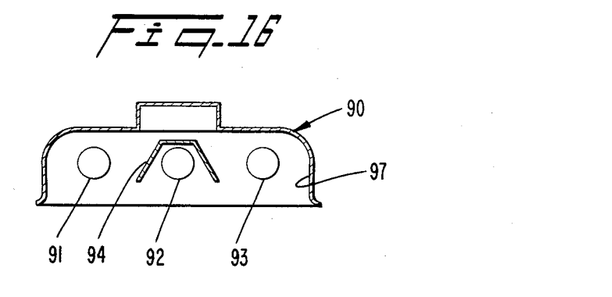
Figure 17:
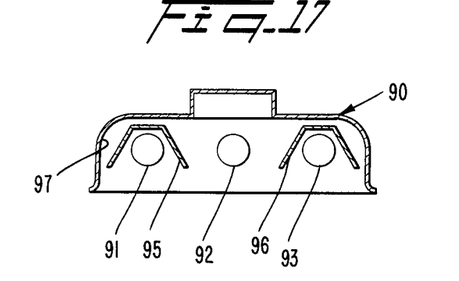
Figure 18:
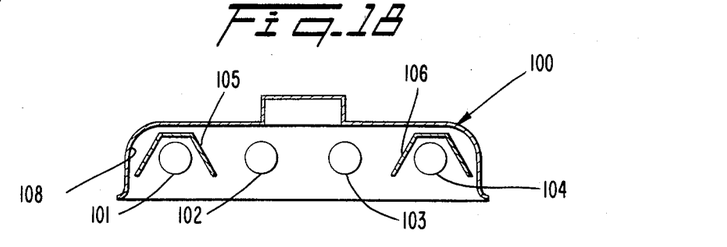
Figure 19:
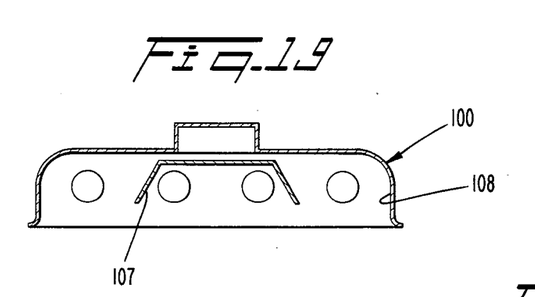

Referring now to FIGS. 15-19, two, three and four lamp industrial fixtures are illustrated which, in their original form, include a housing including interior reflector surfaces and two, three or four lamps. In accordance with the present invention, these fixtures are modified by adding more efficient and higher reflectivity reflectors in accordance with the present invention while leaving all lamps present therein, so as to increase the lumen output thereof while reducing fixture heating. Thus, FIG. 15 shows a fixture 85 including lamps 86 and 87 and wherein a reflector 88 has been placed in surrounding relation to one of the lamps 86. If desired, a reflector 88 could also be placed in surrounding relation to the lamp 87. Thus, the interior reflecting surface 89 of the fixture 85 works in conjunction with reflector 88 to enhance the lumen output of the fixture 85. Similarly, FIGS. 16 and 17 illustrate a three-lamp fixture 90 including lamps 91, 92 and 93. In FIG. 16, a reflector 94 has been placed in surrounding relation to the center lamp 92. In FIG. 17, reflectors 95 and 96 have been placed in surrounding relation to respective lamps 91 and 93. The modifications shown in FIGS. 16 and 17 act to augment the function of the inner-reflective surfaces 97 of the fixture 90. FIGS. 18 and 19 illustrate a fixture 100 including lamps 101, 102, 103 and 104. In FIG. 18, the lamps 101 and 104 have been surrounded by reflectors 105 and 106. In FIG. 19, the lamps 102 and 103 have been surrounded by a single wide reflector 107 which may, if desired, be replaced with two reflectors (not shown) similar to the reflectors 105 and 106 shown in FIG. 18. As in FIGS. 15-17, the purpose for the reflectors shown in FIGS. 18-19 is to augment the lumen output of the fixture 100 by augmenting the function of the inner-reflective surfaces 108 of the fixture 100.

Figure 20:
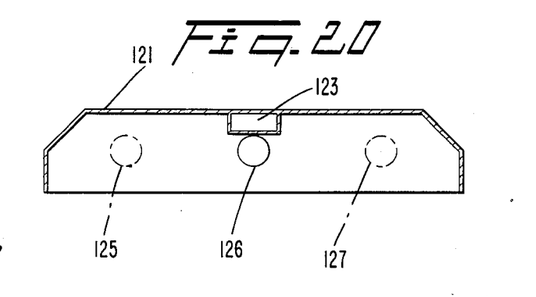
FIGS. 20-22 show schematic end views which sequentially illustrate the retrofitting operation of the present invention as done to convert a three-lamp fixture into a one-lamp fixture.
Figure 21:
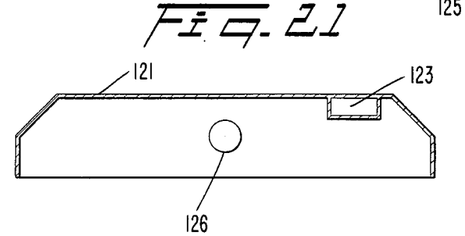
Figure 22:
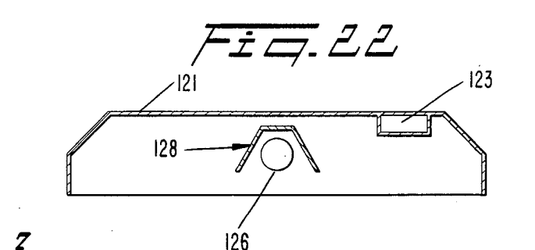

FIGS. 20-22 are similar to FIGS. 6-9 and provide a further example of modifications of an existing fixture including relocation of a ballast. Referring to FIG. 20, a fixture 120 is seen to include a housing 121, a ballast 123 and three lamps 125, 126 and 127. As depicted in FIG. 120, the two outer lamps 125 and 127 have been removed. Referring now to FIG. 21, it is seen that the ballast 123 has been relocated to a position on the housing 121 spaced from the center lamp 126. Referring now to FIG. 22, it is seen that a reflector 128 made in accordance with the present invention has been installed in the housing 121 in surrounding relation to the remaining center lamp 126 to thereby improve the efficiency and lumen output of the fixture 120. It is evident that in the embodiment, no effort has been made to create an illusion that lamps, which were removed, still remain within the fixture.

In the embodiments described above the most common types of lighting fixtures have been discussed within the context of modifications made thereto in accordance with the present invention. The specific description of the preferred embodiments will now continue with descriptions of applications of teachings of the present invention to less common types of fixtures. It is stressed here that it is intended that the teachings of the present invention not be limited merely to the types of fixtures specifically disclosed hereinabove and hereinbelow, but, rather, these descriptions are intended to merely be exemplary of the modifications that may be made in accordance with the present invention to any lighting fixture. Further, it is noted that the teachings of the present invention may not only be used to retrofit existing fixtures, but, rather, may also be utilized in the construction of new fixtures. In this vein, in accordance with the present invention, new fixtures may be constructed utilizing reflectors made of the highly efficient and highly specularly reflective materials disclosed herein as suitable for use in that environment.

Figure 23:
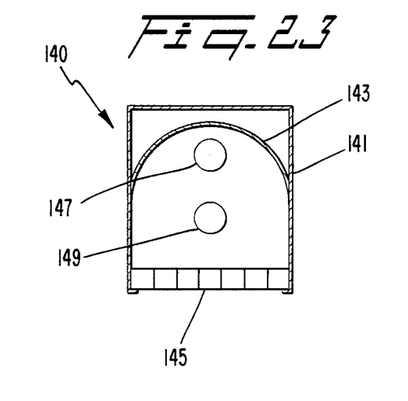
FIG. 23 shows a schematic end view of a lighting fixture including a substantially parabolic reflector and two lamps.
Figure 24:
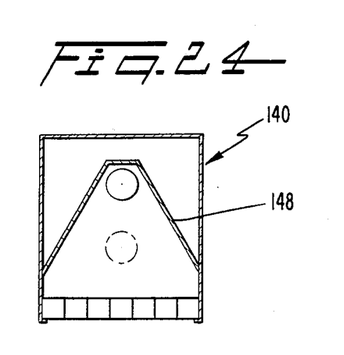
FIGS. 24 and 25 show schematic end views of two examples of the retrofitting of the fixture illustrated in FIG. 23.
Figure 25:
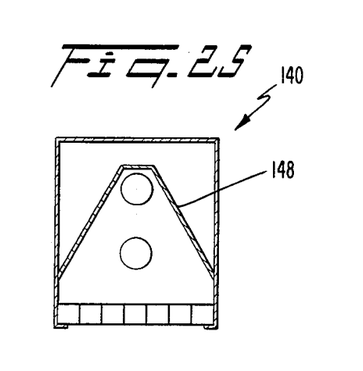

Referring now to FIG. 23, a specialty fixture 140 including a housing 141, a substantially parabolic reflector 143 made of a material such as polished aluminum, a lens 145 and lamps 147 and 149 is shown. In order to increase the efficiency of this specialty fixture 140, one approach, shown in FIG. 24, is to merely remove the lamp 149 closest to the ends 145 and to replace the reflector 143 with a reflector 148 made in accordance with the present invention of a thin silver highly-specularly reflective material. If it is merely desired to increase the lumen output of the fixture 140 while maintaining it power consumption at an equal level to that which was present before modification, the approach shown in FIG. 25 would be suitable. In FIG. 25 it is seen that the fixture 140 has been modified by merely replacing the reflector 143 with the reflector 148 made in accordance with the teachings of the present invention. It is noted that while the power consumption of the fixture 140 as modified as shown in FIG. 25 is the same as the power consumption of the fixture as originally manufactured and shown in FIG. 23, the efficiency of the fixture is increased because the reflector 148 absorbs much less energy from the lamps 147 and 149 than does the reflector 143. This reduction in energy absorbtion results in more light being emitted from the lens 145 and results in a highly increased lumen output for the fixture 140.

Figure 26:
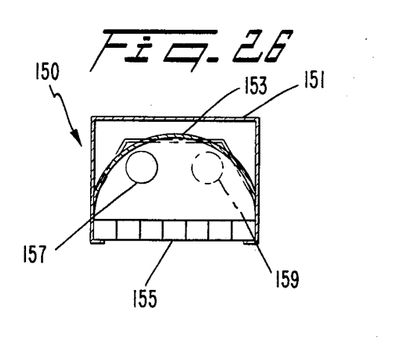
FIG. 26 illustrates a fixture similar to that which is illustrated in FIG. 23 but with the two lamps horizontally mounted rather than vertically mounted.
Figure 27:
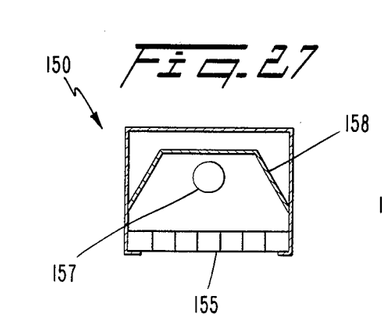
FIG. 27 illustrates a schematic end view of one example of the retrofitting of the fixture of FIG. 26 in accordance with the present invention.

In FIG. 26, a fixture 150 is shown which is similar to the fixture 140 shown in FIG. 23 as including a housing 151, a substantially parabolic reflector 153, a lens 155 and two lamps 157 and 159. The main difference is that the lamps 157 and 159 are mounted in a horizontal line within the fixture 150 whereas the lamps 147 and 149 are mounted in a vertical line in the fixture 140. This difference may easily be ascertained through comparison of FIGS. 23 and 26. As such, the best form of modification for the fixture 150 would be to remove one of the lamps 157 and 159, and as shown in FIG. 26, the lamp 159 has been removed. Subsequently, as shown in FIG. 27, the reflector 153 is replaced with the reflector 158 corresponding to the reflector 148 described above with reference to FIGS. 24 and 25 and, further, the remaining lamp, in this case the lamp 157, is moved to a central location within the fixture to thereby take best advantage of the volume within the fixture and the relationship between the lamp 157 and the reflector 158.

Figure 28:
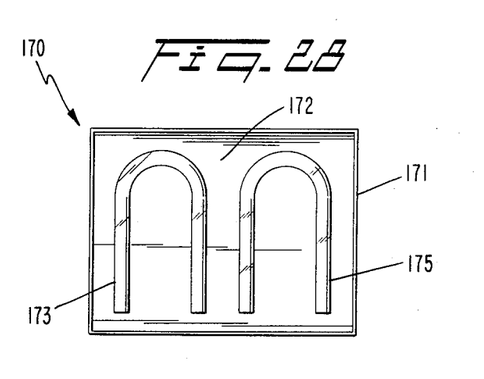
FIG. 28 shows a bottom view of a lighting fixture including two U-shaped fluorescent tubes.
Figure 29:
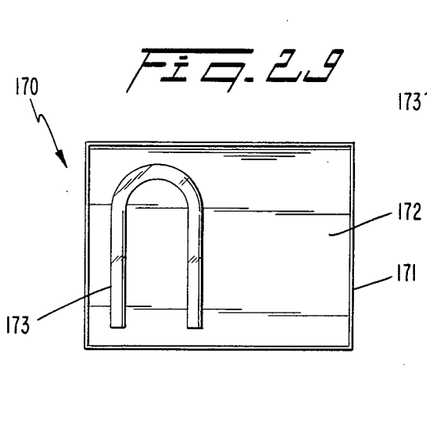
FIGS. 29 and 30 show a bottom view of two steps in the sequence of retrofitting the fixture of FIG. 28 in accordance with the present invention.
Figure 30:
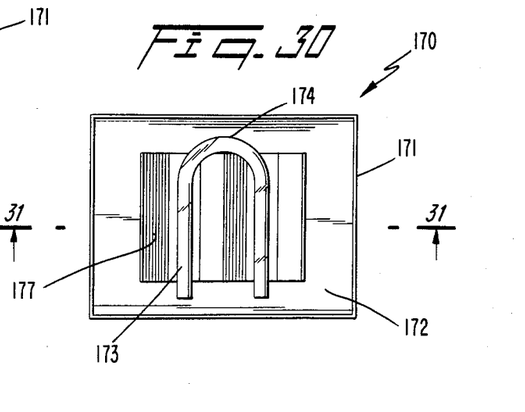

FIGS. 28-31 illustrate the steps taken in modifying a fixture including two U-shaped fluorescent tubes in accordance with the teachings of the present invention. With reference now to FIG. 28, a fixture 170 is shown and includes a housing 171, and inner chamber 172 which may include some reflective surfaces such as polished aluminum or white baked porcelain. Mounted within the chamber 172 are two U-shaped fluorescent lamps 173 and 175. In modifying this fixture 170 to thereby improve its efficiency and retain as much lumen output as possible, a first step is to remove one of the lamps, in this case, for example, the lamp 175 as shown in FIG. 29. Subsequently, the lamp 173 which remains within the fixture 170 is then moved through moving of the supports thereof to a central location within the fixture. This modification is shown in FIG. 30. As further shown in FIG. 30, a further modification is made which consists of the addition of a reflector 177 between the walls of chamber 172 and the lamp 173 to thereby enhance the efficiency and lumen output thereof. As is seen in FIG. 30, the portion 174 of the lamp 173 is not backed by any portion of the reflector 177 installed in accordance with the present invention. The reason for this may best be seen with reference to FIG. 31 which shows the reflector 177 as including outer sides 181 surrounding the outer faces of the lamp 173, faces 183 extending directly between the walls of the chamber 172 and the lamp 173 and inner faces 185 which protrude within the space between the elongated portions of the lamp 173 and which prevent the reflector from being extended so as to cover the portion 174 of the lamp 173. If desired, however, the reflector 177 could be designed so as to include a portion extending from the structure shown in FIGS. 30 and 31 to thereby enable reflection of the lumen output of the lamp 173 in the region 174. Studies have shown that the lumen output of lamps of a U-shaped configuration is insignificant in the region of the bend denoted by reference numeral 174, as such, the addition of reflective material to reflect light outputted by this portion 174 of the lamp 173 is not believed to be a cost-effective exercise.

Figures 31, 32, 33, 34, 35, 36:
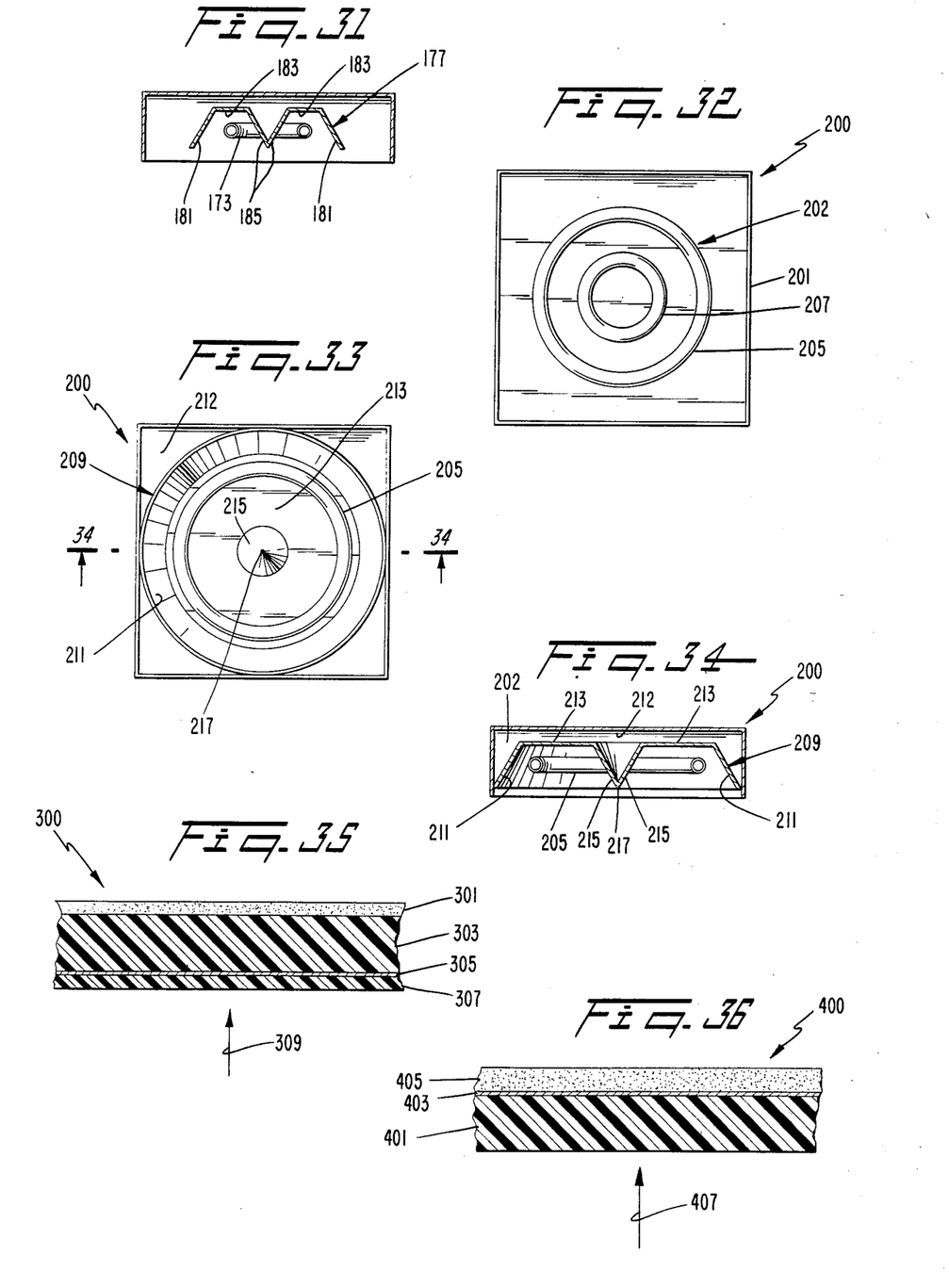
FIG. 31 shows a cross-sectional view along the line 31—31 of FIG. 30.
FIG. 32 shows a bottom view of a lighting fixture including two concentric circular fluorescent tubes.
FIG. 33 shows a bottom view of the fixture of FIG. 32 with the inner tube thereof removed and with a reflector in accordance with the present invention installed therein.
FIG. 34 shows a cross-sectional view along the line 34—34 of FIG. 33.
FIG. 35 shows a cross-sectional view through a first material from which the reflectors in accordance with the present invention may be made.
FIG. 36 shows a cross-sectional view through a second material from which the reflectors of the present invention may be made.

FIGS. 32-34 describe the modification of a fluorescent fixture including as original equipment two concentric substantially circular fluorescent tubes. With reference to FIG. 32, a fixture 200 is seen to include a housing 201 a chamber 202 which may include reflecting surfaces of polished aluminum, white baked porcelain or the like. Mounted within the housing are lamps 205 and 207 with the lamp 205 being substantially doughnut-shaped and the lamp 207 also being substantially doughnut-shaped and concentrically mounted within the fixture 200 with respect to the lamp 205. In modifying the fixture 200 to increase the efficiency thereof, the lamp 207 is removed as shown in FIG. 33 and replaced with a reflector shown in FIGS. 33 and 34 and best shown in FIG. 34. This new reflector 209 includes a first annular surface 211 which extends around the outer periphery of the lamp 205, a second annular surface 213 which is ring-like in nature and extends between the lamp 205 and the wall 212 of the chamber 202, and conical surface 215 which protrudes within the space defined by the lamp 205 and terminates in a pointed portion 217 which is also seen in FIG. 33. The reflector 209 made in accordance with the teachings of the present invention reflects substantially all of the lumen output of the lamp 205 to thereby increase the efficiency of the fixture 200 and to thereby increase the lumen output of the light generated by the lamp 205.

Now, with reference to FIGS. 35 and 36, two materials which have been found to be usable in manufacturing the reflectors described hereinabove in accordance with the present invention will now be described. With reference to FIG. 35, a reflector material 300 is shown and includes a polyester film 303 which is vapor-caoted with a layer of silver 305 which forms a semi-opaque surface. The exposed surface of the silver 305 is then coated with a water-clear acrylic overlay 307 which provides light stability while preventing corrosion of the silver layer 305. If desired, the back of the polyester film 303 may be coated with a pressure-sensitive adhesive 301 which enables the entire reflector 300 to be adhered to whatever surface may be desired. The entire reflector 300 is approximately 3 mils in thickness. Light traveling in the direction of arrow 309 passes through the acrylic layer 307 and is reflected by the silver layer 305 with the reflectance of the reflector 300 approaching 99%. Note, in this regard, U.S. Pat. No. 4,307,150.

Referring now to FIG. 36, an alternative construction of reflector 400 is shown which includes a polyester or other plastic layer 401 onto which has been sputtered a layer of silver 403. This sputtering technique comprises the bombardment of the plastic material 401 with argon and silver atoms with a high impact pressure in a vacuum atmosphere. The argon atoms do not remain in the layer 403 but rather are included to facilitate the successful creation of the layer 403 purely of silver. After the sputtering technique is completed, an adhesive layer 405 is coated over the exposed surface of the silver layer 403 so as to complete the reflector and enable it to be adhered to a desired surface. Light traveling in the direction of the arrow 407 penetrates the polyester layer 401 and reflects off of the silver 403 with the total reflectance of the reflector 400 being approximately 95% to 96%±1%.

With the suitable reflector materials now having been described, the specific description of the present invention will now continue with data concerning the effectiveness of reflectors made of materials 300 and 400 as compared with prior art reflectors.

One of the most important aspects of the present invention is the fact that reflectors made in accordance with the present invention of the materials disclosed in the specification hereinabove and illustrated in FIGS. 35 and 36 exhibit remarkable increases in efficiency and reflectivity over those reflectors presently known in the prior art. One of the reasons for this phenomenon is the fact that the reflectors in the present invention all include silver as the reflecting material. In the reflecting material illustrated in FIG. 35, the silver layer 305 may be anywhere from twenty-five thousandths to one-tenth of a micron in thickness, with the acrylic coating 307 being of a thickness of about two to three ten-thousandths of an inch. Further, the polyester layer 303 is approximately five ten-thousandths of an inch in thickness and the adhesive layer 301 is approximately one ten-thousandth to one thousandth of an inch in thickness. With regard to the material illustrated in FIG. 36, the silver layer 403 is about 2 microns in thickness with the adhesive layer 405 being approximately one ten-thousandth to one thousandth of an inch in thickness and the polyester layer 401 being approximately 1-2 thousandths of an inch in thickness.

The reflector materials disclosed herein as used in conjunction with the reflectors disclosed herein are superior to prior art reflector materials because they include inherent properties which enhance the efficiency and reflectivity of the reflectors made therefrom. In particular, silver is a material that has free electrons on its outer surface and thereby a very strong electrical field is set up within the silver layer of the reflectors of the present invention. This electrical field prevents the photons created by the light source, in this case the lamps, from travelling into the surface of the material. A further benefit of this electrical field is that it rejects the photons and thereby reflects them from the surface of the silver material to thereby also limit absorption of energy from the photons. This phenomenon acts to increase the efficiency of reflectors utilizing the silver material therewith. Because the silver material refuses to allow the photons to travel below the surface thereof, the reflectivity in total and in specular aspects are considerably higher in percentage than any reflectors known in the prior art. The fact that the materials disclosed herein and illustrated in FIGS. 35 and 36 use an extremely thin layer of the silver material reduces the cost per area of reflectors utilizing the material. Another important feature of the materials disclosed herein is the fact that in each case, the micro-structure of the surface of the silver layers thereof exposed is extremely smoothed by any standard of measurement and as such reflectors utilizing these materials exhibit a higher index of reflectivity than has been previously found in reflector technology.

Figure 38:
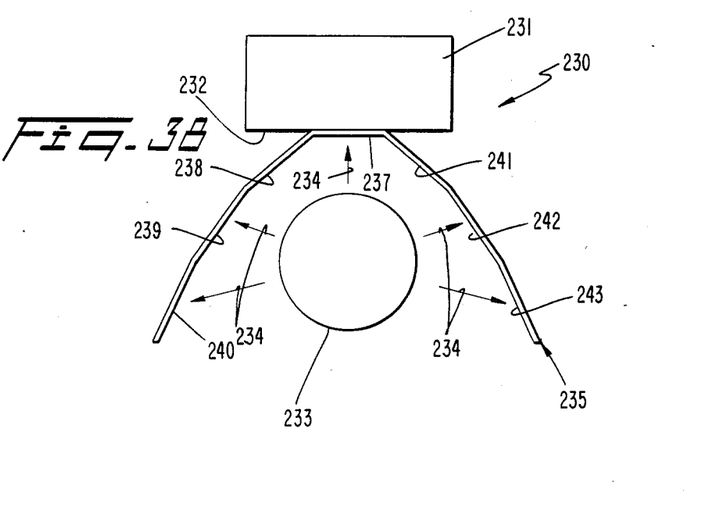
FIG. 38 shows a further example of a fixture including a reflector made in accordance with the present invention.

FIG. 38 shows one further example of a reflector made in accordance with the teachings of the present invention. As shown in FIG. 38, the fixture 230 is of the "strip" type although the teachings of this figure are applicable to any type of fixture. The fixture 230 includes a ballast 231 and one lamp 233. The fixture 230 may have originally included only one lamp or may have originally included two lamps and may have been modified in accordance with some of the teachings of FIGS. 6–9 wherein a two lamp fixture is shown to have one lamp removed and the remaining lamp moved to a central location therein. The fixture 230 has been modified through the addition of a reflector 235 made of one of the materials disclosed herein.

The reflector 235 includes a side 237 substantially parallel to the ballast surface 232 and further sides 238, 239, 240 to one side thereof and further sides 241, 242, 243 to the other side thereof. In one example of this reflector, the angles between the respective sides may be as follows: 240–239: 170°; 239–238: 165°; 238–237: 140°; 237–241: 140°; 241–242: 165°; 242–243: 170°. Of course other angle configurations may be used as desired in varying lighting situations. The configuration of the reflector 235, with its many sides, acts to powerfully reflect and focus downwardly, the light emanating from the lamp 233 in the direction of arrows 234. As the number of sides increases, the reflector 235 would begin to resemble a parabola and this is one of the reasons for the particular shape of the reflector 235. It is further noted that the large number of sides of the reflector 235 results in a large number of interreflections of the light emanating from lamp 233 before the light leaves the fixture 230. In this regard, the high reflectivity and efficiency of the materials utilized in the reflectors of the present invention enables these interreflections to take place without the large losses in lumen output and high amount of fixture heating attributable to fixtures utilizing less efficient and less reflective reflector materials.

In a paper entitled "Super Reflectors for Energy Efficient Luminaires" by Finch and Schwartz, the following has been disclosed, and is paraphrased here:

In recent instrument designs, an effort has been made to separate the diffuse and specular components of the reflected light. Usually the components are separated by considering the light reflected within ±4° of specular angle to be specular. This light then ia allowed to exit from the integrating sphere reflectometer so that all remaining light is trapped within the sphere and is measured as diffuse light. This is a crude measure of the specularity, but has been used by many research people and instrument manufacturers with some modifications of the specular zone angle from ±3° to ±7°.

There are other commercial instruments wherein specular or semispecular reflectance measurements made. One typical one is the Dori meter. In essence, this meter utilizes a collimated light beam from a small projector which is incident on the specimen plane at 30° (nominal). The reflected beam is then measured by a small aperture in the 30° reflectance direction. Additional measurements are made adjacent to the specular aperture within a small angular aperture, usually about 1/10° to ½° wide. Then the measure either the haze component or the so-called diffuse components, additional measurements are made at 2°, 5° and 15° to the side of the principal angle of specular reflection at 30°. These secondary measurements are a measure of the scattered light outside of the truly specular direction.

In order to make interlaboratory or interinstrument comparisons of the specularly reflected light and/or the diffusely reflected light, it is necessary to precisely define the instrument and the technique that is used. For the super reflectors that we are considering, it is customary to relate the light to the side of the specular direction as scattered light and to evaluate the scatter function in terms of the peak value of the specularly reflected light. One problem is that the scattered light is a very low order compared to the peak. In typical super-reflecting materials we find that in a direction as little as 2° offset from the peak the scattered light may be $0.00001 \times$ the peak.

The total of the scattered light is in a small zone around the direction of the specularly reflected light. The total surface reflectance equals the specular reflectance plus the scattered reflectance. In typical high reflectance, highly specular surfaces, the total of the scattered light will be typically less than 3% of the specularly reflected light. The geometry of the system therefore dictates some very peculiar and difficult measurement problems. The specular component must be measured within a very small solid angle and will develop a high value with respect to the light in the surrounding zone. The integrated scattered light over the surrounding zone will be much smaller and cannot be measured with as great a precision as the specular component. It is necessary to very carefully define the geometrical relationships among the various parameters. For instance, the incident light on the sample may be collimated to provide effectively parallel light or it may be diverging or converging on the sample. The size of the incident cone angle must be described as well as the distribution of the flux within the cone angle. Similarly the reflected components must be defined in terms of the cone angle and/or the solid angle of the receiver. The distances and angles involved for the interception equipment (photocell, photographic plate, or other media) must be completely described. Other physical phenomena, such as polarization and spectral absorption, may also be involved.

Figure 37:
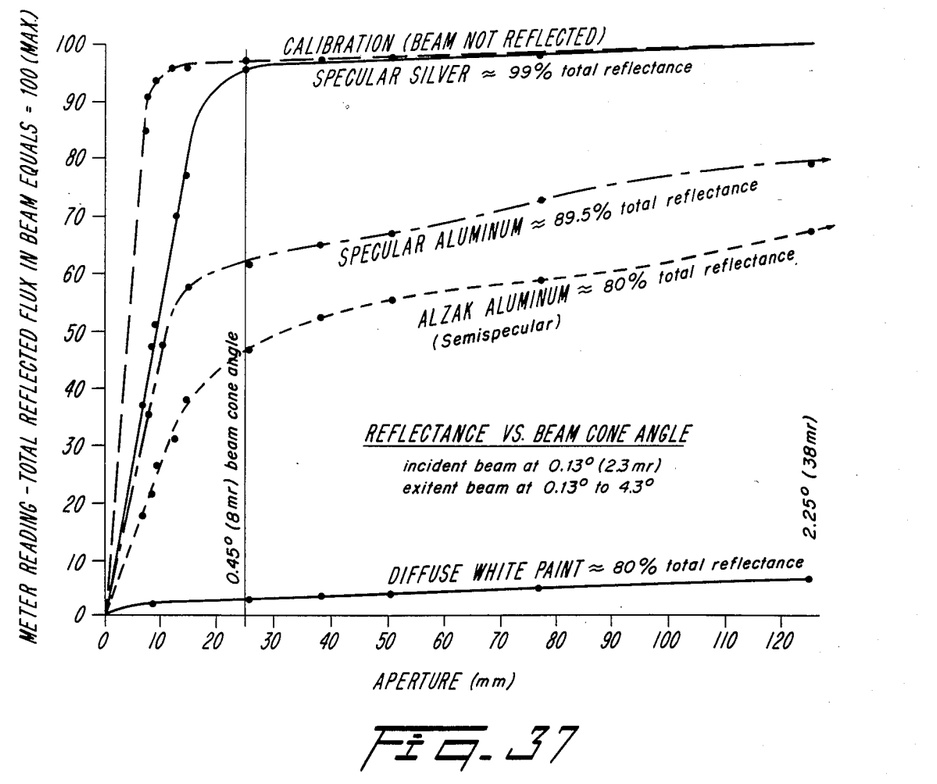
FIG. 37 shows a graph comparison of total reflected flux for several reflector materials.

In terms of the standard classifications for reflectance measurements, the measurement that we are discussing is referred to as conical-conical. In other words, the incident light will be in a small bundle within a small solid angle from a principal direction and the reflected light from the specimen will be intercepted as a small bundle of light within a small solid angle. Typically the incident bundle of rays will have a divergence angle of less than ½° or approximately 8 milliradians. Similarly the exitant or reflected bundle of rays considered to be the specular component will be confined within a cone angle of approximately 8 milliradians. These are smaller solid angle values that are typically used in commercially available instruments to define the specular reflected light. Instruments now in current use range from 17 to 122 milliradians for the cone angle of the reflected light. The definition for specularly reflected light that we have used in our measurements and in the design of our equipment calls for an incident beam of 2.3 milliradians (0.13°) divergence and a reflected beam with a similar 2.3 milliradian (0.13°) divergence. The area on the specimen that is illuminated by the incident beam is a circular spot approximately 0.5 inches in diameter at a distance of 68 in. from the source. Similarly, the measured specular light is in a spot on the receiver 0.3 in. diameter at a distance of 60 in. from the 0.5 in. dia. spot on the specimen. The measuring system is very simple and consists of a high quality collimator using a very small pinpoint aperture for the light source and a lens aperture of 0.75 in. dia. The image of the light source is focused on a 4.5 in. dia. port in a 10 in. dia. integrating sphere located a total distance of 128 in. from the source. The image size at 128 in. is approximately 0.3 inches in diameter. The reflected light from a perfectly specularly 100% reflecting surface placed at 68" from the source would therefore fall within the 0.3 inch image dimension at the receiver. Any light falling outside of the 0.3 inch diameter circle is stray light that is scattered as non-specularly reflected light from the surface. The area of the receiver is adjusted by means of diaphragms placed in front of the opening of the integrating sphere. As the aperture of the diaphragm is increased beyond the 0.3 in. nominal diameter, the increase in the output of the photocell in the sphere is due to the scattered nonspecular light. The scatter function can then be measured by plotting the photocell output as a function of the diameter of the aperture. Typical plots for a series of measurements on various materials are shown in FIG. 37. The plotted data in FIG. 37 show the difference in the scattered light from four surfaces outside of the 2.3 milliradian (0.13°) divergence angle of the incident beam. Note that at a divergence angle of 4°, all measurable scattered light has been received from the silver surface so that the total reflectance is the integrated sum of the specular plus the scattered light. On the other hand, a diffuse material such as the white painted sample shows a continuing increase in total light reflected as the scatter zone is increased. The total integrated reflected light from the white paint may be very high, but cannot be measured with this special equipment since the reflected light is only integrated over a cone angle of 4.3° from the surface of the reflector. The results shown in FIG. 37 are summarized in the following table.

TABLE I

| Material | Specular Reflectance 8 mr (0.45°) cone | Scattered Reflectance 75 mr (4.3°) cone | Total Refl. (within 4.3° cone) | Total Within Hemisphere |
|---|---|---|---|---|
| Silver-Super reflector | 97% | 0.6% | 97.6% | 99% |
| Aluminum- | 65% | 15% | 80% | 89.5% |

TABLE I-continued

| Material | Specular Reflectance 8 mr (0.45°) cone | Scattered Reflectance 75 mr (4.3°) cone | Total Refl. (within 4.3° cone) | Total Within Hemisphere |
|---|---|---|---|---|
| Specular Aluminum-Alzak | 47% | 17% | 64% | 80% |
| White paint on aluminum | 3% | 3% | 6% | 80% |

The silver type super reflector material was also measured by a laboratory not associated with the author, as follows:

TABLE II

| Test No. | Material | Specular Refl. | Diffuse Refl. | Total Refl. |
|---|---|---|---|---|
| 1 | Silver reflectorized plastic sheet | 93.9% | 3.7% | 97.6% |
| 2 | Silver reflectorized plastic sheet | 96.0% | 3.6% | 99.6% |
| 3 | Aluminum reflectorized plastic sheet | 84.8% | 3.2% | 88.0% |

The above measurements were made in an integrating sphere type reflectometer with a port to exclude the specular component. The measurements used MgO as a reference and NBS reference plates for calibration.

Authors Finch and Schwartz subsequently tested the efficiency of the silver film material as compared to six other types of materials and arrived at the following results:

TABLE III

| Test No. | Material | Efficiency | % increase over polished alum. |
|---|---|---|---|
| 1 | Polished aluminum (Std) | 69.2% | — |
| 2 | Polished aluminum (Special) | 73.2% | 5.8% |
| 3 | White paint (special) | 75.9% | 9.7% |
| 4 | White paint (std) | 73.0% | 5.5% |
| 5 | Semi-specular alum | 67.7% | −2.2% |
| 6 | Hammered finish alum | 70.4% | 1.7% |
| 7 | Silver film | 82.2% | 18.8% |

As stated hereinabove, one of the advantages accruing from the high specular reflectivity and total reflectivity of the materials disclosed herein as used in making the reflectors of the present invention and as exemplified in Tables I and II is the large amount of lumen output which accrues from these reflectors even after a plurality of reflections within the fixture. Since most modular fixtures emit light by interreflection of the light about reflecting surfaces, the higher the total reflectance, the higher the eventual radial flux into the area which is to be lit. As is seen from Table IV a reflector with 95% total reflectance would result in array of light having 77% of its original radiant flux after 5 interreflections whereas, for example, with a reflector having a total reflectance of 90%, the same ray would only retain 59% of its original radiant flux, a decrease of approximately 23% from the same ray when utilized in conjunction with a reflector of 95% total reflectance. As can be seen from Table IV, even slight reductions in the total refluctance of a reflector yield significant reductions in radiant flux from out of the fixture. Accordingly, the reflectors made in accordance with the present invention yield remarkable improvements in both radiant flux i.e. lumen output as well as efficiency in fixtures made in conjunction therewith whether retrofitted or original equipment. These increases in efficiency are due to the fact that the reflector material does not allow the photons to enter beneath its surface and as such the energy carried by the photons does not become absorbed in any great amount by the reflector material, consequently fixtures utilizing the reflectors of the present invention stay significantly cooler than prior art reflector fixture systems.

TABLE IV

| Total Reflectance | % Retention of Original Radiant Flux After Five Reflections |
|---|---|
| 99% Total Reflectance | A Ray Would Retain 95% of Original. |
| 95% Total Reflectance | A Ray Would Retain 77% of Original. |
| 90% Total Reflectance | A Ray Would Retain 59% of Original. |
| 80% Total Reflectance | A Ray Would Retain 33% of Original. |

A further test was conducted by applicant in an effort to demonstrate the improved lighting resulting from the use of a specular silver reflector as compared to the use of a polished aluminum reflector. In the test, a single 2'×4' four lamp fixture was suspended at varying heights above a table on which a footcandle meter was placed. In one aspect of the test, the fixture was fitted with a polished aluminum reflector and the amount of footcandles of light impinging on the table top was measured with the fixture mounted at ceiling heights varying from seven feet to ten feet. Then, the same test was conducted but this time with the fixture fitted with a specular silver optical reflector of identical structure as the polished aluminum reflector. Before the tests, the reflectors were found to have the following reflectance characteristics:

TABLE V

| Material | Specular Reflectance | Diffuse Reflectance | Total Reflectance |
|---|---|---|---|
| Specular Silver | 95% | 1% | 96% |
| Polished Aluminum | 47% | 17% | 80% |

The test results are displayed in Table VI and the vastly greater light output realized through the use of the specular silver reflector are believed to be quite remarkable.

TABLE VI

| Ceiling Ht. | Table Ht. | Light at table top in foot candles Specular Silver | Light at table top in foot candles Polished Aluminum | % increase specular silver over pol. alum. |
|---|---|---|---|---|
| 10'0" | 2'6" | 50 | 37 | 26% |
| 9'6" | 2'6" | 55 | 41 | 26% |
| 9'0" | 2'6" | 64 | 47 | 27% |
| 8'6" | 2'6" | 74 | 56 | 25% |
| 8'0" | 2'6" | 80 | 63 | 22% |
| 7'6" | 2'6" | 95 | 75 | 22% |
| 7'0" | 2'6" | 115 | 87 | 25% |

The invention as disclosed herein has been disclosed in terms of numerous examples of applications of the present invention to different embodiments of pre-existing lighting fixtures. It is stressed here, that these embodiments are intended to merely be examples of applications of the present invention. For example, the present invention may be employed to retrofit any existing lighting fixture so as to improve its efficiency and/or lumen output. Further, the teachings of the present invention may be utilized in creating new fixtures and incorporation of the techniques included in the present invention as disclosed herein will result in finished product lighting fixtures having efficiencies and lumen outputs vastly improved over those of the prior art. Accordingly, since many modifications, changes and alterations may be contemplated in the teachings of the present invention by one skilled in the art, it is intended that the scope of the present invention only be limited by the following claims.

I claim:

1. In a lighting fixture having an original lumen output including a base, original reflector means in said base and a plurality lamp means mounted on said base and connectable to a source of electricity, a method of improving the efficiency of said fixture and maintaining lumen output of said fixture at a high percentage of said original lumen output, comprising the steps of:
    (a) removing some of said lamp means;
    (b) installing further reflector means in substantially surrounding relation to the lamp means remaining in said fixture after said removing step without removing said original reflector means;
    (c) isolating said remaining lamp means from said original reflector means by said further reflector means.

2. The method of claim 1, further including the step of covering substantially the entirety of said original reflector means with said further reflector means.

3. The method of claim 1, wherein said further reflector means is made of a thin film of silver covered with plastic and has a total reflectivity greater than 90%.

4. The method of claim 1, further including the step of relocating at least one of said remaining lamp means prior to said installing step.

5. The method of claim 1, further wherein said lighting fixture includes ballast means, and further including the step of relocating said ballast means prior to said installing step.

6. The method of claim 1, further comprising the step of bending said further reflector means so as to create the illusion that at least one of said some of said lamp means has not been removed.

7. The method of claim 1, wherein said further reflector means comprises a plurality of reflectors.

8. The method of claim 7, wherein said remaining lamp means comprises a plurality of lamps.

* * * * *